United States Patent [19]
Lee

[11] Patent Number: 5,862,020
[45] Date of Patent: Jan. 19, 1999

[54] HARD DISK DRIVING APPARATUS USING SURFACE-TREATING METHOD

[75] Inventor: Joo-Shik Lee, Seoul, Rep. of Korea

[73] Assignee: SamSung Electronics Co., Ltd., Suwon, Rep. of Korea

[21] Appl. No.: 890,482

[22] Filed: Jul. 9, 1997

Related U.S. Application Data

[62] Division of Ser. No. 527,059, Sep. 12, 1995, Pat. No. 5,706,573.

[30] Foreign Application Priority Data

Oct. 27, 1994 [KR] Rep. of Korea ............... 27722/1994

[51] Int. Cl.$^6$ ............................................... G11B 5/55
[52] U.S. Cl. ................................................. 360/106
[58] Field of Search .......................... 360/97.01–98.01, 360/105, 106

[56] References Cited

U.S. PATENT DOCUMENTS

| | | | |
|---|---|---|---|
| 5,099,374 | 3/1992 | Ohkita et al. | 360/106 |
| 5,270,887 | 12/1993 | Edwards et al. | 360/97.03 |
| 5,282,099 | 1/1994 | Kawagoe et al. | 360/97.01 |
| 5,355,268 | 10/1994 | Schulze | 360/106 |
| 5,363,260 | 11/1994 | Kawakami | 360/97.01 |
| 5,369,538 | 11/1994 | Moe et al. | 360/106 |
| 5,404,636 | 4/1995 | Stefansky et al. | 360/104 |
| 5,483,400 | 1/1996 | Tsujino | 360/106 |
| 5,585,981 | 12/1996 | Lee | 360/106 |

*Primary Examiner*—Jefferson Evans
*Attorney, Agent, or Firm*—Robert E. Bushnell, Esq.

[57] ABSTRACT

A novel fabricating technique for a hard disk driver is constructed with mounting a bottom plate onto a base having nuts integrally embedded therein by screwing fixing screws into the nuts via the corresponding tapped holes formed in the bottom plate so as to produce a first structure, surface treating the first structure, mounting a top plate having a pair of legs at opposite end portions bent in a L-shape onto the bottom plate by screwing fixing screws into the nuts via respective holes of the legs and corresponding tapped holes formed in the bottom plate so as to produce a second structure, and surface treating the second structure. Surface treatment of the first and second structures are performed using an electrodeposit coating process so that dust particles accumulated during fabrication can be easily eliminated and static friction between recording head and recording medium embodied therein can be prevented.

9 Claims, 3 Drawing Sheets

HARD DISK DRIVING APPARATUS USING SURFACE-TREATING METHOD

This is a division of application Ser. No. 08/527,059 filed 12 Sep. 1995, now U.S. Pat. No. 5,706,573.

CROSS-REFERENCE TO RELATED APPLICATIONS

This application makes reference to, incorporates the same herein, and claims all benefits accruing under 35 U.S.C. 517 119 from an application for Method For Fabricating A Hard Disk Driving Apparatus earlier filed in the Korean Industrial Property Office on 27 Oct. 1994 and assigned Ser. No. 27722/1994.

BACKGROUND OF THE INVENTION

1. Technical Field

The present invention relates to a method for fabricating a disk drive system of a hard disk, and more particularly to a method for surface-treating respective structural components of a disk drive system.

2. Background Art

In general, a hard disk apparatus of a rotary actuator type for use with a microcomputer, for example, as shown in U.S. Pat. No. 5,369,538 for *Rotary Disk Drive Actuator* issued to Moe et al., U.S. Pat. No. 5,363,262 for *Magnetic Disk Apparatus And Method For Manufacturing The Same* issued to Kawakami, and U.S. Pat. No. 5,404,636 for *Method Of Assembling A Disk Drive Actuator* issued to Stefansky et al., is constructed with a generally, rectangularly shaped base serving as a frame accommodating a plurality of circular disks coaxially mounted in a stack upon a spindle driven by a motor mounted on the base to provide a plurality of cylindrical base surfaces that serve as a memory into which binary information may be written and read, an actuator mounted upon the base by a pivot such as a threaded fastener to freely rotate about the longitudinal axis of pivot, and a voice coil motor assembly positioned to respond to electrical control signals and thereby arcuately displace a proximal end of the actuator. Actuator arm supports, at its distal end, a plurality of electromagnetic transducers commonly known as read/write actuator heads corresponding to the distinct separate cylindrical base surfaces of disks that serves as memories. Typically, the base surfaces of disk are coated with a magnetically sensitive material that responds to fields created by corresponding ones of actuator heads, to enable the actuator heads to either write bits of information at selected locations along tracks formed on the surface of the disk, or to read information from those tracks. Generally, the disk continuously rotates in a single direction while the voice coil motor assembly acts upon the proximal end of the actuator arm to arcuately displace the proximal arm relative to motor and thereby cause the distal ends of actuator arm to radially position heads along corresponding base surface of disk. A cover is then mounted upon the upper surface of base, to enclose disks, actuator and voice coil motor assembly, and to thereby seal the interior of disk drive in order to protect the environment where disks reside from dust and contaminants. Known tape seals such as one disclosed in U.S. Pat. No. 5,270,887 issued to *Compact Disk Drive Head Disk Assembly With Conformable Tape Seal* issued to Edwards et al. may be used to provide a substantial airtight seal between the base and cover to thereby maintain a desired clean environment within the disk drive.

Actuator heads "fly" over the corresponding base surfaces of disks, and are normally spaced apart from those surfaces by a low flying height, for example, 4 $\mu$m formed by a cushion of air generated by the rapid rotation of the disks. Voice coil motor assembly drives the proximal end of actuator to move heads to a desired information track of disks. Generally, voice coil motor assembly includes a bottom plate, a top plate, magnets and a current coil fixed to the proximal end of the actuator. The current coil is situated between the bottom plate and the magnet with fixed gaps between them. When a control current flows through the coil, the actuator rotates about the longitudinal axis of pivot by an interaction of magnetic fluxes produced individually by the coil and the magnet. As the actuator heads maintain a low flying height over the disk surface, even small dust particles, such as cracked particles created during fabrication of disk drive including voice coil motor assembly, can interfere with the head/disk interface, causing the heads to "crash" or otherwise interfering with the reading/writing of data onto the disk surface.

Accordingly, it has been necessary to keep the air in the disk drive housing relatively free dust particles and other contaminants so as to maintain high performance of the disk drive. Conventional method for fabricating voice coil motor assembly requires all components to be surface treated with a thin nickel coating. For example, the top and bottom plates are individually coated by a well-known nickel plating process, the magnet is coated by either the nickel plating or an electrodeposit coating process, the base and the cover are individually coated by either electrodeposit coating process or chromate conversion treatment. In addition to the surface-treatment of each individual component of the voice coil motor assembly, cleaning, pretreatment, drying and packaging of each individual component arc all necessary prior to the final assembly. Consequently, production cost of the hard disk is increased; moreover, it is difficult to completely eliminate all dust particles generated during the assembling of all respective components of the voice coil motor assembly. If the dust particles are not completely eliminated, the hard disk is then contaminated, and "crash" or "scratch" often occurs in the actuator heads or the disk surface.

SUMMARY OF THE INVENTION

Accordingly, it is therefore an object of the present invention to provide a novel method for assembly of, and a voice coil motor assembly in a hard drive so as to eliminate dust particles.

It is also an object of the present invention to provide a novel method for assembling a voice coil motor assembly in a hard drive in which the cleaning, pretreatment, drying and packaging of each individual component of the voice coil motor assembly can be eliminated.

It is another object of the present invention to provide a method for fabricating a voice coil motor assembly in a disk drive in which static friction between transducer heads and disk surface can be prevented.

According to the aspect of the present invention, the method for assembling a voice coil motor assembly in a disk drive contemplates on mounting a bottom plate onto a base having nuts integrally embedded therein by screwing a first plurality of screws into the nuts of the base via the corresponding tapped holes formed in the bottom plate, forming a first structure by attaching a first magnet onto an exterior surface of the bottom plate, treating the surface of the first structure with an electrodeposit coating, forming a second structure by attaching a second magnet onto an interior surface of a top plate having a pair of legs at opposite end portions bent in a L-shape, treating the surface of the second structure with an electrodeposit coating, and mounting the top plate onto the bottom plate by screwing a second plurality of screws into the nuts of the base via respective holes of the legs and corresponding tapped holes formed in the bottom plate.

According another aspect of the present invention, the method for assembling a voice coil motor assembly in a disk drive contemplates on affixing a bottom plate onto a base of a housing by adhesive exhibiting conductive characteristics, forming a first structure by attaching a first magnet by adhesive exhibiting conductive characteristics onto an exterior surface of the bottom plate, treating the surface of the first structure using an electrodeposit coating process, forming a second structure by attaching a second magnet by adhesive exhibiting conductive characteristics onto an interior surface of a top plate bent into a U-shape, affixing the top plate to a cover of a housing by adhesive exhibiting conductive characteristics, treating the surface of the second structure using the electrodeposit coating process, and then mounting the top plate attached to the cover onto the bottom plate affixed to the base. The electrodeposit coating is applied on both the first and second structures so as to prevent deterioration of adhesive bonding between the top plate and the cover, and between the bottom plate and the base.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
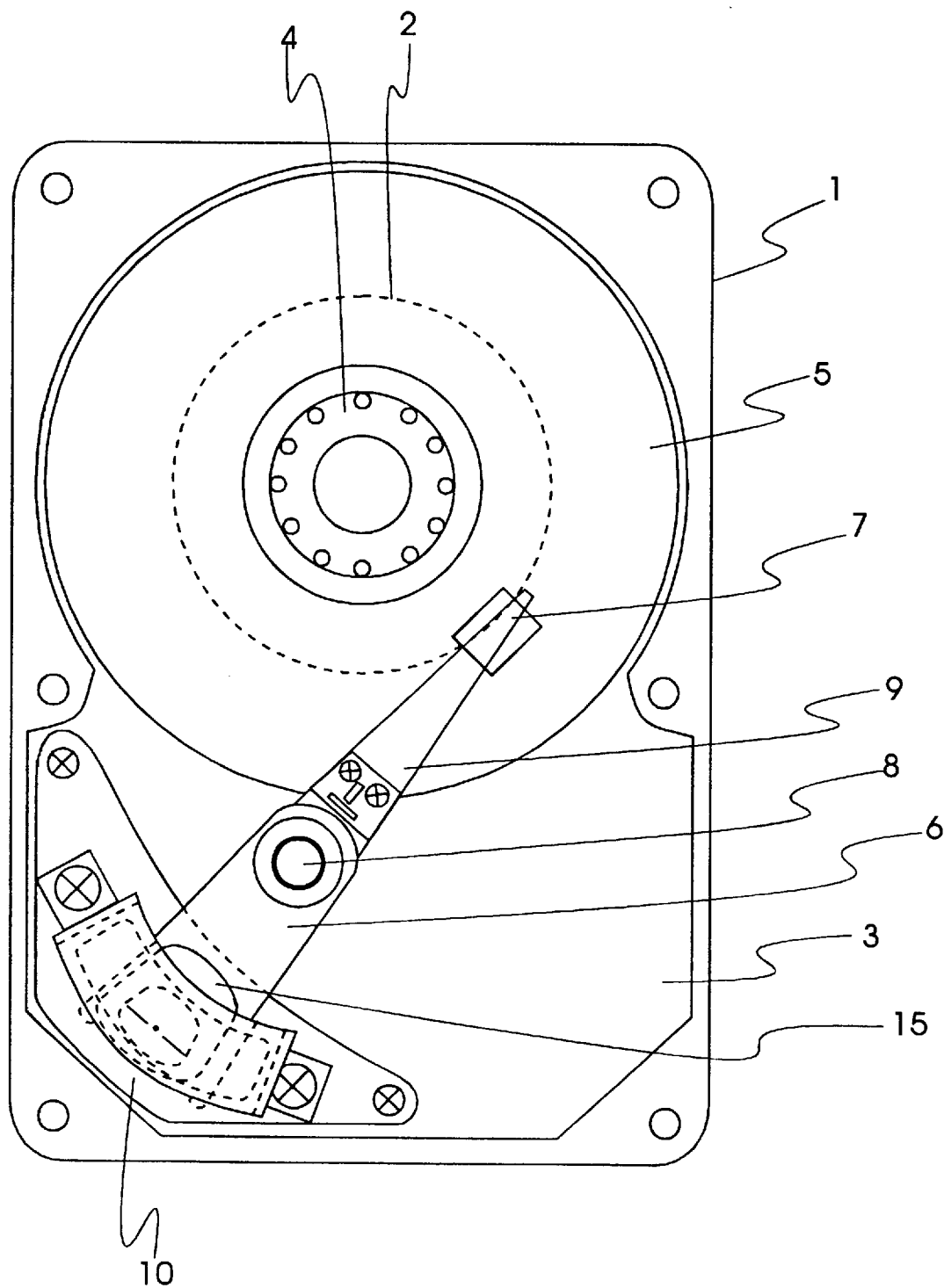
FIG. 1 is a perspective view illustrating a hard disk drive containing a voice coil motor assembly constructed according to the principles of the present invention.

Referring now to the drawings and particularly to FIG. 1 which illustrates a hard disk drive of a rotary actuator type showing its cover removed. As shown in FIG. 1, the disk drive has a housing 1 having a substantially rectangular shaped base 3 serving as a frame providing a major interior surface accommodating at least one circular disk 5 coaxially mounted upon a spindle shaft 4 of motor 2 fixed on base 3, an actuator 6 mounted upon pivot shaft 8 so as to freely rotate about the longitudinal axis of pivot 13, a voice coil motor assembly 10 mounted onto base 3 so as to serve as drive mechanism for rotating the actuator 6 when a control current flows through coil 15 by an interaction of magnetic fluxes produced individually by the coil and magnet placed therein. Actuator 6 supports, at its distal end 9, an electromagnetic transducer 7. As disk 5 rotates during operation, transducer 7 reads or writes information on or from the disk in a manner such that it is kept narrowly above the disk surface.

Figure 2:
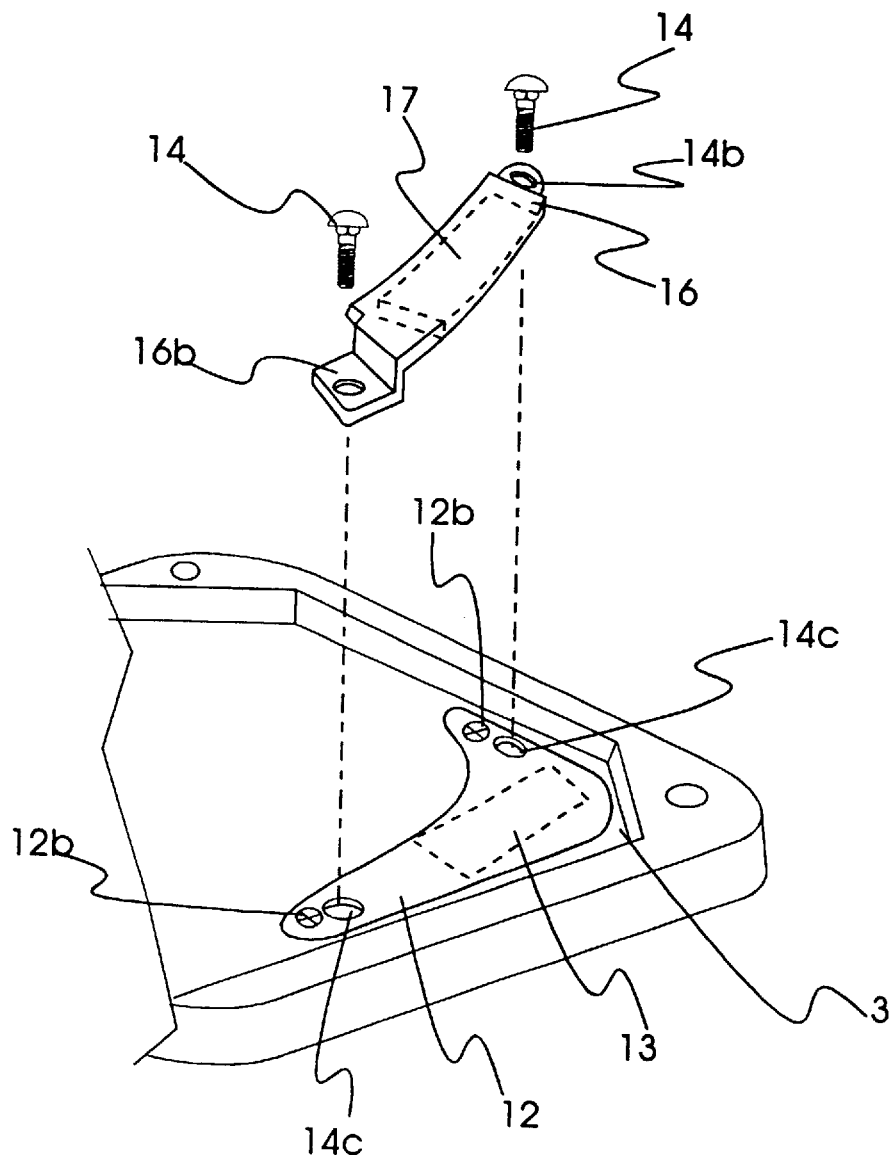
FIG. 2 is an exploded perspective view showing the way in which top and bottom plates of the voice coil motor assembly may be mounted in the practice of the present invention.

FIG. 2 shows an exploded perspective view of how all individual components of the voice coil motor are assembled in accordance with the principles of the present invention. Bottom plate 12 may be formed from a magnetic material, is mounted on the base 3 having by screwing fixing screws 12b into nuts integrally embedded in base 3. If the bottom plate is not formed from a magnetic material, permanent magnet 13 may be affixed onto bottom plate 13. Top plate 16 having a pair of legs 16b at opposite end portions bent in a L-shape is mounted onto the bottom plate 12 by screwing thread and receiving fasteners such as screws 14 into the receiving fasteners such as, for example, nuts integrally embedded in base 3, via respective holes 14b of legs 16b and corresponding tapped holes 14c formed through the bottom plate 12. Top plate 16 faces the bottom plate 12 at a predetermined distance therefrom in parallel relation while its legs 16b rest on bottom plate 12. Permanent magnet 17 is fixed to the inner surface of the top plate 16, and also faces the bottom plate 12 at a predetermined distance in parallel relation therefrom.

Figure 3A:
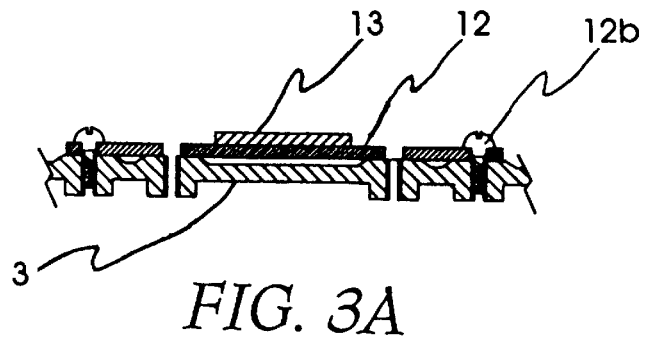
FIGS. 3A, 3B and 3C illustrate how the voice coil motor may be assembled in accordance with one embodiment of the present invention.
Figure 3B:
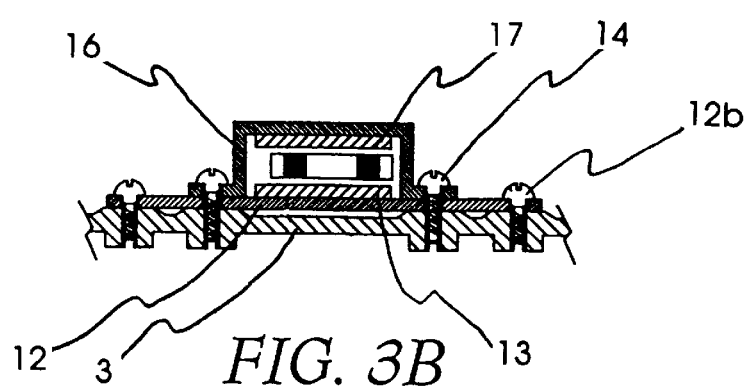
Figure 3C:
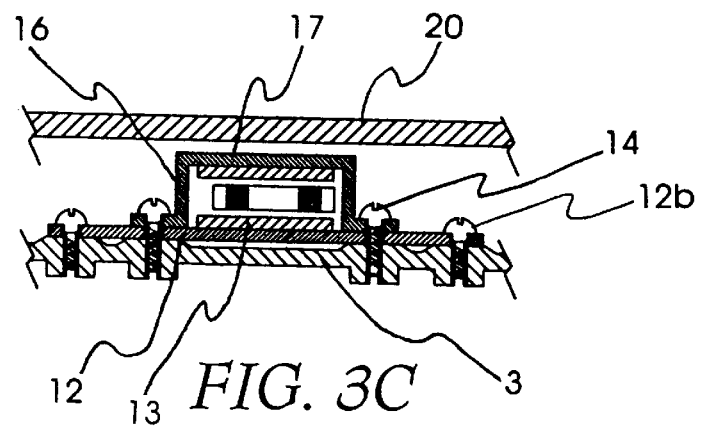

Referring to FIGS. 3A, 3B and 3C, the novel method for fabricating a voice coil motor assembly in a disk driver performed in accordance with the principles of the present invention is illustrated. As shown in FIG. 3A, bottom plate 12 is mounted onto base 3 having nuts integrally embedded therein by screwing screws 14 into the nuts 14c via the corresponding tapped holes 14b formed through bottom plate 12. Permanent magnet 13 is affixed onto bottom plate 12 by adhesive such as, for example, epoxy exhibiting conductive characteristics, if the bottom plate 12 is not formed from a magnetic material so as to form a first structure. The first structure is subject to surface treatment so as to eliminate even small dust particles accumulated during the mounting of the bottom plate 12. Permanent magnet 17 is then affixed onto an interior surface of top plate 16 having a pair of legs 16b at opposite end portions bent in a L-shape so as to form a second structure. The second structure is also subject to surface treatment so as to eliminate dust particles formed thereon. The top plate having permanent magnet 17 affixed thereon, is then mounted onto bottom plate 12 by screwing threaded screws 14 into the nuts 14c via respective holes of the legs 16b and corresponding tapped is holes 14b formed in the bottom plate 12 as shown in FIG. 3B.

According to the principles of the present invention, if all components of disk drive are to be assembled within a short time, for example, two weeks, and the humidity is normal, standard surface cleaning of the surface of the first and second structures may be sufficient to withstand erosion and eliminate dust particles. If, on the other hand, contact portions between the magnet 13 and bottom plate 12 and between screws 12b, 14 and base 3 exhibit conductivity, an electrodeposit coating is applied on the surface of the first and second structures so that dust particles accumulated during fabrication can be easily eliminated and static friction between recording head and disk can be prevented. Electrodeposit coating may apply on both the interior surface and exterior surface of the top plate 16 having permanent magnet 17 affixed thereon for forming the second structure before top plate 16 is mounted onto bottom plate 12 having permanent magnet 12 affixed thereon. One example for such an application is to dip the entire top plate 16 into an electrodeposit coating bath so that all surface may be fully treated. Alternatively, electrodeposit coating may also apply on the surface of the voice coil motor assembly after the top plate 16 having permanent magnet 17 affixed thereon is mounted onto bottom plate 12 having permanent magnet 12 affixed thereon.

Once the surface of the first and second structures is treated with an electrodeposit coating so as to eliminate dust particles accumulated during fabrication, cover 20 is mounted upon base 3 of the housing so as to enclose disk, actuator and voice coil motor assembly, and to thereby seal the interior of disk drive in order to protect the environment where disks reside from dust and contaminants as shown in FIG. 3C. According to the present invention, since each of the first and second structures is cleaned because of the surface-treatment, even small dust particles accumulated during the mounting of bottom plate 12 and top plate 16 can be eliminated. Moreover, even those dust particles remaining on the structures, are solidly attached onto surface of the structures during the surface-treatment and thus do not interfere with the head/disk interface and do not cause the heads to "crash" or otherwise interfere with the reading/writing of data onto the disk surface as commonly occurs in the conventional art.

Figure 4:
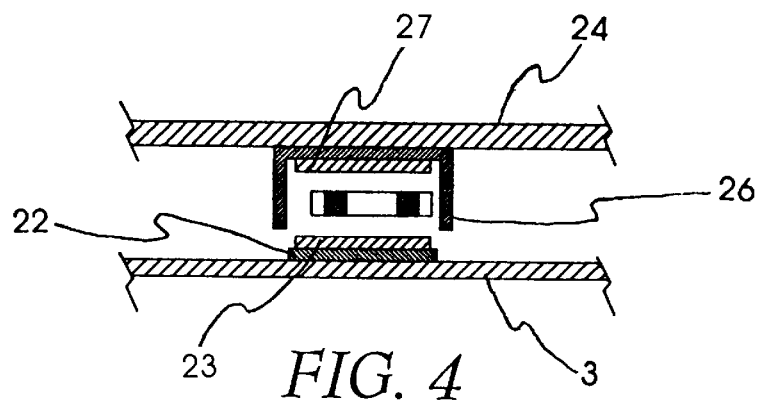
FIG. 4 illustrates how the voice coil motor may be assembled in accordance with another embodiment of the present invention.

Referring now to FIG. 4 which illustrates another embodiment of the voice coil motor assembly according to the present invention. In this alternative embodiment, the voice coil motor assembly has similar circuit components, except that those circuit components are assembled together by adhesive rather than by fasteners such as nuts and bolts as shown in FIGS. 3A–3C. As shown in FIG. 4, the fabrication method follows the steps of: (1) affixing bottom plate 22 onto base 3 by adhesive exhibiting conductive characteristics; (2) attaching a first magnet 27 by the same adhesive therebetween so as to form a first structure; (3) surface-treating the first structure; (4) affixing top plate 26 bent into a U-shape to cover 24 by the same adhesive; (5) attaching a second magnet 23 by the same adhesive therebetween so as to form a second structure; (6) surface-treating the second structure; and (7) mounting the top plate 26 affixed to the cover 24 onto the bottom plate 22 affixed to the base 3. Similar to the first embodiment as shown in FIGS. 3A–3C, the surfaces of the first and second structures are separately treated with an electrodeposit coating process so as to cover the adhesive and to thereby advantageously prevent gas leaking from the adhesive bonding which contribute to the head erosion and contamination inside the disk drive and induce static friction between transducer head and disk. Alternatively, the surface of the first and second structure may be treated with an electrodeposit coating after the first structure is mounted onto the second structure to form the voice coil motor assembly. Accordingly, even if gas is generated due to deterioration of the adhesive bonding, it may not escape the electrodeposited coating and does not contribute to the head erosion and contamination of the disk drive. Moreover, static friction between transducer head and disk can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk drive, comprising:

a base having a substantially rectangular shape and having first and second plurality of threaded nuts integrally formed therein;

a recording medium;

rotating means mounted on the base, for rotating the recording medium;

actuator means rotatably mounted on the base, for supporting a transducer head for recording and reading information on the recording medium;

a voice coil motor assembly for enabling said actuator means to rotate substantially in a radial direction of the recording medium, said voice coil motor assembly comprising:

a bottom plate having a first magnet attached thereon, mounted on said base by screwing a first plurality of screws into the first plurality of threaded nuts of said base via corresponding tapped holes formed in said bottom plate, said bottom plate having an exterior surface protected by a protection film;

a top plate having a pair of legs at opposite end portions bent into a L-shape and having a second magnet attached thereon an interior surface, mounted on said bottom plate by screwing a second plurality of screws into the second plurality of threaded nuts of said base via respective holes of the legs and corresponding tapped holes formed in said bottom plate, said top plate having said interior surface protected by a protection film prior to being drawn against said bottom plate; and a coil mounted on said actuator means and disposed between said first and second magnets, for interacting with said magnets to produce magnetic fluxes enabling said actuator means to rotate substantially in the radial direction of the recording medium.

2. The disk drive as claimed in claim 1, wherein said protection film is provided by an electrodeposit coating process.

3. The disk drive as claimed in claim 1, wherein said first magnet is attached onto the exterior surface of said bottom plate, and said second magnet is attached onto the interior surface of said top plate by adhesive exhibiting conductive characteristics, respectively.

4. The disk drive of claim 1, comprised of said protection film obstructing leakage of gases from adhesives.

5. The disk drive of claim 1, comprised of said protection film reducing dust accumulated during fabrication.

6. A disk drive, comprising:

a base having a substantially rectangular shape;

a recording medium;

rotating means mounted on the base, for rotating the recording medium;

actuator means rotatably mounted on the base, for supporting a transducer head for recording and reading information on the recording medium;

a voice coil motor assembly for enabling said actuator means to rotate substantially in a radial direction of the recording medium, said voice coil motor assembly comprising:

a bottom plate having a first magnet attached thereon by adhesive exhibiting conductive characteristics, mounted on said base by said adhesive and having an exterior surface protected by a protection film;

a top plate bent into a U-shape and having a second magnet attached thereon an interior surface by adhesive exhibiting conductive characteristics, affixed on a cover of a housing by said adhesive, and then mounted on said base and secured around said bottom plate by said adhesive when said top plate is drawn against said bottom plate, said top plate having said interior surface protected by a protection film prior to being drawn against said bottom plate; and a coil mounted on said actuator means and disposed between said first and second magnets, for interacting with said magnets to produce magnetic fluxes enabling said actuator means to rotate substantially in the radial direction of the recording medium.

7. The disk drive as claimed in claim 6, wherein said protection film is provided by an electrodeposit coating process.

8. The disk drive of claim 6, comprised of said protection film obstructing leakage of gases from said adhesives.

9. The disk drive of claim 6, comprised of said protection film reducing dust accumulated during fabrication.

* * * * *